United States Patent [19]

Wilson

[11] Patent Number: 4,846,092
[45] Date of Patent: Jul. 11, 1989

[54] AMPHIBIOUS VEHICLE WITH IMPROVED CLEAT DESIGN

[76] Inventor: Paul Wilson, 1304 MacArthur Ave., Harvey, La. 70058

[21] Appl. No.: 85,469

[22] Filed: Aug. 13, 1987

[51] Int. Cl.$^4$ ............................................. B62D 55/20
[52] U.S. Cl. ...................................... 114/270; 305/34; 305/54; 305/55
[58] Field of Search .................. 305/15, 34, 39, 54, 305/55, 60, 24, 35 R, 35 EB, 53; 152/180, 182; 280/28.5; 180/184, 190; 114/270; 416/7

[56] References Cited

U.S. PATENT DOCUMENTS

| | | | |
|---|---|---|---|
| 1,340,514 | 5/1920 | Allen | 305/39 |
| 1,608,517 | 11/1926 | Masury | 305/39 |
| 2,404,487 | 7/1946 | Hait | 115/1 |
| 2,528,890 | 11/1950 | Lawrence | 120/5 |
| 2,546,523 | 3/1951 | Reynolds | 305/25 |
| 2,644,691 | 7/1953 | Pohle | 305/60 |
| 3,339,987 | 9/1967 | Korner | 305/55 |
| 3,580,317 | 5/1971 | McHargue | 305/55 |
| 3,842,785 | 10/1974 | Rivet | 305/25 |
| 3,883,190 | 5/1975 | Kilbane | 305/35 |
| 4,093,318 | 6/1978 | Edwards | 305/11 |
| 4,121,875 | 10/1978 | Stedman | 305/39 |
| 4,123,119 | 10/1978 | Stedman | 305/39 |
| 4,203,633 | 5/1980 | Hare | 305/34 |
| 4,385,652 | 5/1983 | Frank | 305/55 |
| 4,448,459 | 5/1984 | Kortering | 305/54 |
| 4,530,545 | 7/1985 | Bertelsen | 305/34 |

FOREIGN PATENT DOCUMENTS

| | | | |
|---|---|---|---|
| 2746828 | 4/1978 | Fed. Rep. of Germany | 305/39 |
| 629113 | 9/1978 | U.S.S.R. | 305/39 |
| 1416602 | 12/1975 | United Kingdom | 305/34 |

OTHER PUBLICATIONS

Kori Corp. v. Wilco Marsh Buggies and Draglines, 561 F. Supp. 512 (E.D. La. 1981) aff'd., 708 F. 2d 151 (5th Circ. 1983).

Kori Corp. v. Wilco Marsh Buggies and Draglines, 761 F. 2d 649 (Fed. Cir. 1985).

*Primary Examiner*—Joseph F. Peters, Jr.
*Assistant Examiner*—Clifford T. Bartz
*Attorney, Agent, or Firm*—Jeffrey W. Tayon; Ned L. Conley

[57] ABSTRACT

An amphibious vehicle is comprised of pontoons, a drive system and endless tracks. The endless tracks are comprised of drive chains and hollow drive cleats in the shape of truncated pyramids.

21 Claims, 4 Drawing Sheets

AMPHIBIOUS VEHICLE WITH IMPROVED CLEAT DESIGN

BACKGROUND OF THE INVENTION

This invention pertains to the field of track driven vehicles, more particularly amphibious track driven vehicles, and more specifically to amphibious track driven vehicles used in swamps and marshes.

Amphibious track driven vehicles used in swamps and marshes are commonly known as swamp or marsh buggies. Most amphibious vehicles are comprised of three primary elements: a pontoon structure which provides flotation and forms a base for the mounting of equipment; a propulsion system which supplies power to drive the vehicle; and continuous tracks which engage the ground, water or other media and which, when engaged with the propulsion system, propel the vehicle.

Amphibious vehicles are used to carry men, equipment and material into swamps and marshes. The vehicle commonly forms a support base for the mounting of a piece of equipment, such as a backhoe, a tree cutter or a dragline, commonly used in the clearing of swamps and laying pipeline or the like. Thus, the vehicle is often used as a piece of construction equipment, in addition to its function as a transportation vehicle.

Unique problems are presented to individuals or companies which attempt to work in swamps or marshes. Heavy equipment, such as back hoes and drag lines which are used to dig trenches, will sink into the mud of the marsh if not specially modified for marsh operation. Further, any vehicle used in the marsh must be able to operate in water or mud. Therefore, the vehicle should be buoyant and weight is a primary consideration. Finally, the vehicle must be capable of traversing terrain which includes obstacles, primarily tree stumps, without having its buoyancy adversely affected.

BRIEF DESCRIPTION OF THE PRIOR ART

One amphibious vehicle which was recognized as a commercial success is shown in U.S Pat. No. 2,546,523, Reynolds, Aug. 20, 1947. This amphibious vehicle was used in the 1940's and 1950's to carry seismic survey crews into marshes to hunt for oil and gas.

In the early 1950's, draglines were set on the Reynolds type marsh buggy to dig pipeline trenches in treeless marsh. These marsh buggies were limited to use in treeless areas, because tree stumps could penetrate the Reynolds pontoon structure causing the marsh buggy to sink. Also, tree stumps and other foreign obstacles could bend the track cleats of this marsh buggy, which then ruptured the pontoon and likewise caused the marsh buggy to sink. This problem of pontoon penetration by foreign objects continues to plague amphibious vehicle designers to this day.

The search for oil and gas in swamp areas during the 1950's, and the failure of the Reynolds machine to hold up in tree stumped swamp, necessitated other solutions to the problem of moving heavy construction equipment in and out of the swamp. One such solution involved the use of large mats laid on the floor of the swamp. Construction equipment, including back hoes, hydraulic tree cutters, draglines, and the like, were placed on the mats. The mat distributed the weight of the construction equipment over a greater area than the tires or mounts of the equipment itself, thereby creating a stable platform on which to work the equipment.

However, the mats had three major drawbacks; they had to be transported into the swamp and moved each time the construction equipment was moved; the equipment would slide off the mats and into the swamp; and, the mats would become damaged which necessitated their frequent replacement.

Amphibious vehicle designers, wishing to avoid the use of mats, improved the durability of the amphibious vehicle by altering the design of the pontoons, cleats, and endless track system which supports the cleats. For example, Quality Industries, Inc., a supplier of amphibious vehicles from Thibodeaux, Louisiana, as well as others, developed pontoons with interior reinforcement and internal vertical bulkheads. These refinements reduced the twisting and buckling loads on the pontoon which often lead to pontoon rupture. The internal bulkheads separate the pontoon into several watertight chambers. This improved overall pontoon durability because only that chamber which was punctured would fill with water and the vehicle could remain buoyant. Tassin, Inc. of Westwego, Louisiana, another amphibious vehicle builder, designed a pontoon with longitudinal lower pontoon braces, interior pontoon bulkheads, and roller guides on the continuous chains. These roller guides are spaced near the middle of the cleat, which creates a third point of support on the cleat and thereby reduces cleat bending. Mr. Douglas Ritchie of Lockport, Louisiana, another amphibious vehicle designer, developed a pontoon with internal horizontal I beams and bulkheads, exterior track guides, and low coefficient of friction plastic support blocks on the track cleats spaced between the chain roller attachments and roller guides.

In addition to improving the pontoons and adding protective devices to the cleats, designers of the amphibious vehicles also improved the structural rigidity of the cleats. Tree stumps and other foreign objects can penetrate the bottom of the pontoon only after passing through the continuous tracks which envelope the pontoon. The cleats often bend, which allows foreign objects to penetrate the track area and puncture the pontoon. Likewise, the cleat itself may bend or break and force itself through the bottom of the pontoon.

The original amphibious vehicle cleat design used a length of standard aluminum channel beam which was as long as the pontoon is wide. The cleats were mounted on a set of continuous chains which surround the pontoon with the cup, or open, side of the channel section (C-Section) facing out. This design did not prove satisfactory, because the cleats would bend and often break under load which allowed tree stumps or other obstacles, including the broken cleats, to puncture the pontoon. This bending also reduced the life of the individual cleat and necessitated frequent cleat replacement and roller chain maintenance.

To address the deficiencies of the standard C-Section cleat, a modified C-Section cleat was developed. This cleat has a thicker root section and thicker side walls with a slightly greater taper than the standard C-Section cleat. Although these cleats are stronger than the standard C-Section cleat, they still bend and warp, which necessitates frequent repair and allows pontoon penetration. Other cleat improvements, such as widening cleats to reduce the load per unit area of ground contact, were developed for cleats exposed to soft ground.

Another solution to cleat warpage is the use of wood blocks placed on the back of the cleat to prevent the cleat from bending and thereby rupturing the pontoon or creating a space in the track through which a tree stump or other foreign object can enter and puncture the pontoon. In another attempt to solve the cleat bending problem, bolt heads were welded to the back of the cleat. Both the bolt heads and the wood blocks served the purpose of Mr. Richie's support blocks; to distribute weight against the pontoon and limit cleat bending. Later improvements, such as the use of a longitudinal wear pad on the bottom of the pontoon in which the bolt or support block would ride, further served these purposes. Further, Huey Rivet obtained U.S. Pat. No. 3,842,785, which shows the combination of:

(1) Vertical bulkheads spaced in the pontoon;
(2) Spaced I beams welded transversely in the bottom of the pontoon;
(3) Plastic support blocks on the cleats between the chain drive elements which engage wear pads on the outside of the bottom of the pontoon. If the Rivet buggy encounters a tree stump or other obstacle, the support blocks on the cleat engage the wear bars on the bottom of the pontoon, in an attempt to prevent the cleat from deforming excessively, which excessive deformation would allow the obstacle, or the cleat itself, to reach the pontoon. These aforementioned improvements either increased the structural integrity of the pontoon, created barriers between the pontoon and the cleat, or simply increased the size of the then existing cleat in an attempt to eliminate or reduce the incidence of pontoon rupture or track and cleat repair.

The history of the prior art leading to the Rivet patent, U.S. Pat. No. 3,842,785, is recited in more detail in the several published judicial opinions concerning that patent including *Kori Corp. v. Wilco Marsh Buggies and Draglines*, 761 F.2d 649 (Fed. Cir. 1985); *Kori Corp. v. Wilco Marsh Buggies and Draglines*, 708 F.2d 151 (5th Cir. 1985), *Kori Corp. v. Wilco Marsh Buggies & Draglines, Inc.*, 561 F.Supp. 512 (E.D. La. 1982). That history is hereby incorporated by reference as though fully set forth herein.

Continuous drive track systems are also used in non-marsh buggy applications such as dozers. These devices generally are heavier than marsh buggies and do not contain pontoons or other flotation elements. Further, their cleats are commonly made from heavy materials, such as cast iron. Such cleats are disclosed in U.S Pat. No. 1,608,517, 4,093,318, 1,340,514, 4,123,119, 4,121,855, West German No. 2,746,828 and USSR No. 629113.

A modification of a cleat for use in soft ground, such as peat or ash, is disclosed in U.S Pat. No. 4,121,875. In this patent, a wide cover plate, which is bolted to the existing track cleat, is claimed. The wider plate spreads the weight of the machine over greater area thereby reducing the load per unit area. Likewise, U.S. Pat. No. 4,123,119 discloses a widened track shoe with an apex portion, which the inventor states gives greater weight bearing capacity on soft ground. Both of these patents disclose the use of a larger cross-section cleat to spread the existing weight over a greater cross-sectional contact area. In both cases, the track itself is larger, and presumably heavier, than the standard dozer track.

Cleats having a triangular cross-section are used on these devices. However, they differ from the present invention in their design and metallurgy. Those known to the inventor have a Vee-shaped cross-section wherein the tip of the Vee is rounded. Further, they are open bottomed, i.e., they do not have a chamber area for flotation. Finally, they are made of cast iron, not aluminum or other relatively low density material, as is used in the present invention.

SUMMARY AND OBJECTS OF THE INVENTION

An object of the invention is to provide an amphibious vehicle which can function in swamps without the need for support blocks behind the cleats and wear pads on the pontoons.

A second object of the invention is to provide an amphibious vehicle which can function in swamps without the need for frequent replacement of the track cleats.

Another object of the invention is to provide a track cleat with greater strength yet substantially equivalent or lower weight in water than the prior art cleat and spacer-wear pad system.

Another object of the invention is to provide an amphibious vehicle with greater track cleat durability than has previously been available, without substantial weight increase in water.

Another object of the invention is to provide a durable amphibious flotation pontoon and drive system.

Another object of the invention is to provide an amphibious vehicle having cleats which are structurally strong enough to support the weight of the entire vehicle and its payload without the need for support blocks and low coefficient of friction plastic material as shown in U.S. Pat. No. 3,842,785.

Another object of the invention is to provide an amphibious vehicle having a cleat with a sealed airtight compartment that provides buoyancy.

Another object of the invention is to provide an amphibious vehicle having a cleat which does not pack with mud or other foreign material.

Another object of the invention is to provide an amphibious vehicle having a cleat having a truncated triangular design which gives the marsh buggy greater traction in marsh and more paddling efficiency in water.

Another object of the invention is to provide an amphibious vehicle having a rigid cleat which will maintain roller chain alignment, which provides greater weight distribution, less chain wear and greater chain life.

Another object of the invention is to provide an amphibious vehicle having a cleat design which reduces chain maintenance and overhaul which increases the effective usefulness of the marsh buggy by reducing down time for chain and cleat repair and replacement.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENTS

The invention may take form in various parts and arrangements of parts. The drawings are only for purposes of illustrating preferred and alternative embodiments of the invention and are not to be construed as limiting it.

While there are many forms the invention may take, the principle of the invention is best shown in FIGS. 1 through 5.

Figure 1:
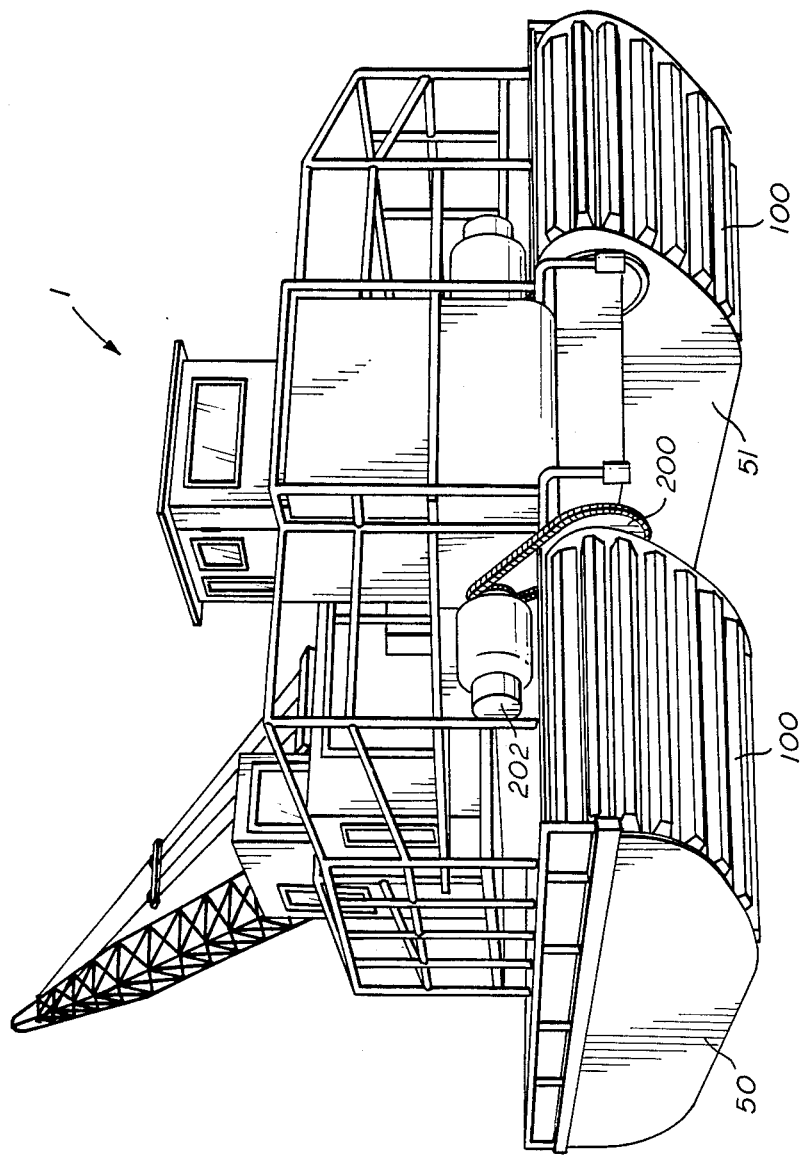
FIG. 1 is a drawing of the amphibious vehicle with the track cleats of the invention.

Referring to FIG. 1, an endless drive track 100 envelopes pontoon 50 and is driven by a drive sprocket 200 keyed thereto which is itself driven by a hydraulic motor 202. One hydraulic motor 202 is used typically per amphibious vehicle 1 pontoon 50, 51. Each hydraulic motor 202 is preferably driven by a reversible variable displacement pump which in turn are driven by a single engine, preferably a gasoline or diesel engine. The hydraulic motor and drive sprocket are old in the art.

Figure 2:
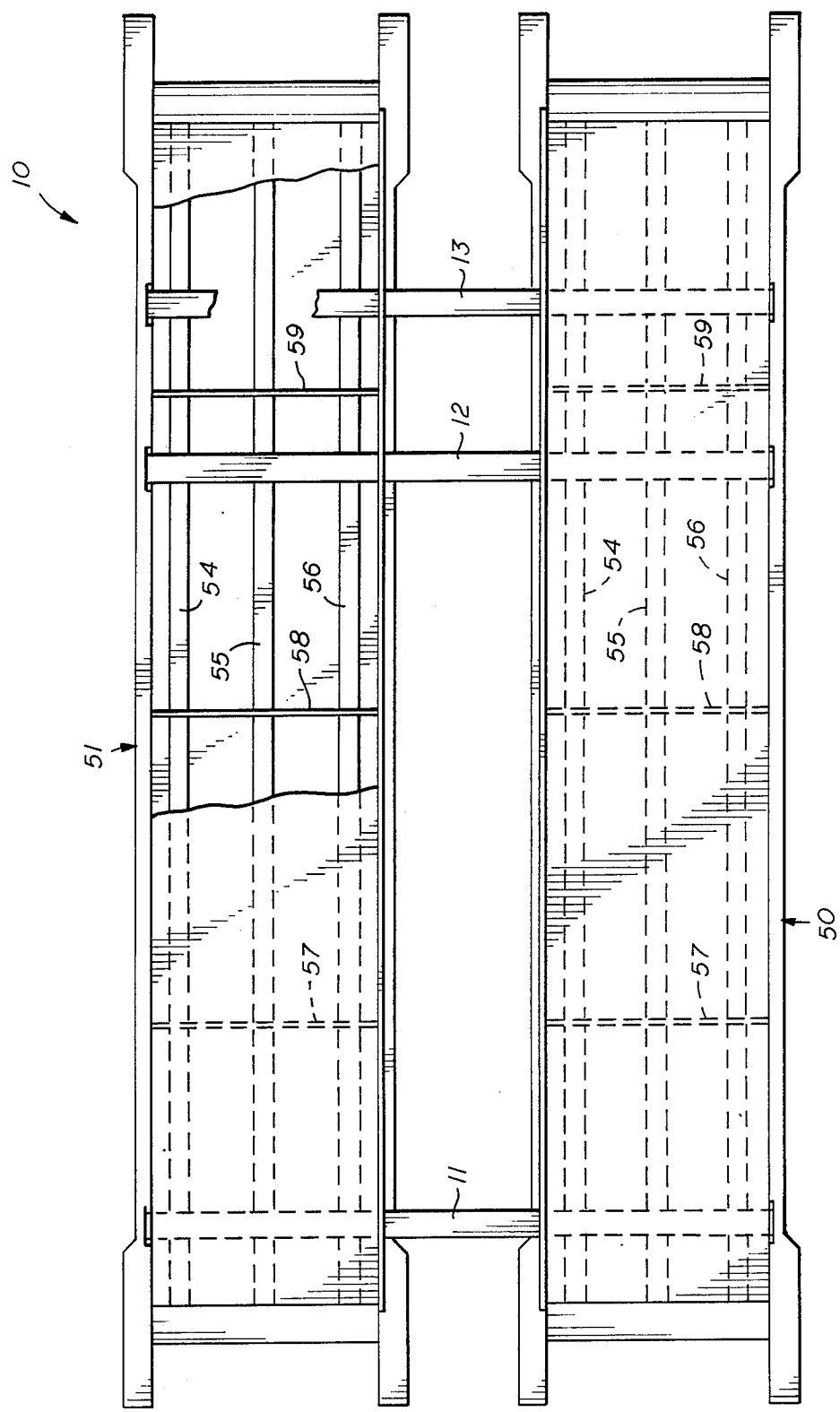
FIG. 2 is a detail drawing of the pontoon construction.

Referring to FIG. 2, reference numeral 10 designates the flotation system constructed according to the invention having pontoons 50 and 51 maintained in parallelism by transverse I-beams 11, 12 and 13 welded to the pontoons. The pontoons are further subdivided by a plurality of bulkheads 57, 58 and 59, which are transverse to the interior of the pontoon creating a series of water-tight chambers. Each pontoon also contains a plurality of longitudinal support beams, 54, 55 and 56, which are welded to the inside of the bottom of the pontoon. The pontoon and I-beam structure is well known in the art, and reference is made to U.S. Pat. No. 3,842,785, for further details of the pontoon construction.

Figure 3:
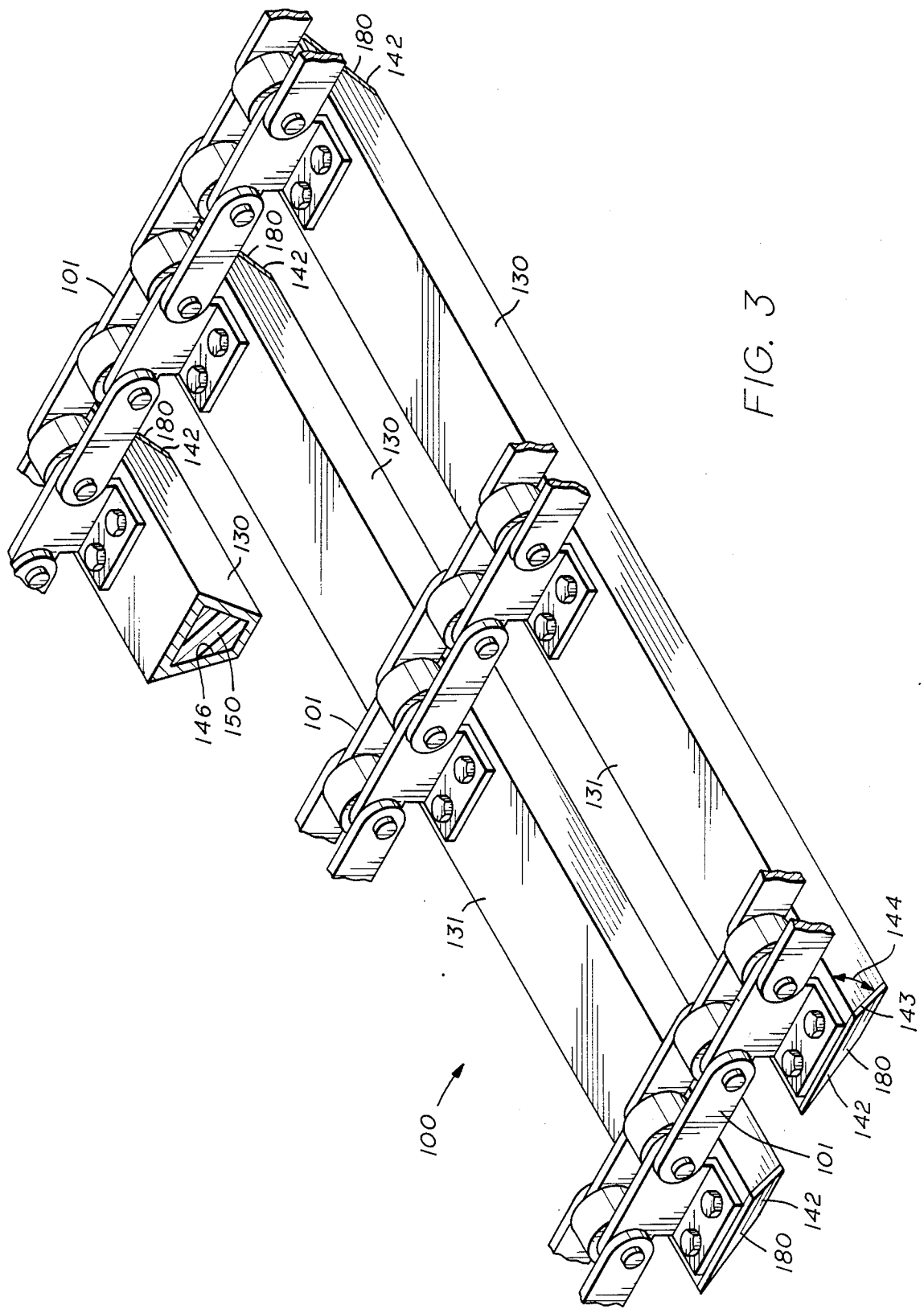
FIG. 3 is a drawing of a portion of the continuous drive track showing a perspective view of a preferred embodiment of the invention.

Referring to FIG. 3, endless drive track 100 is comprised of endless chains 101 and track cleats 130. Endless chains 101 are well known in the art, and are disclosed in U.S. Pat. No. 3,842,785. This chain and roller system is well known in the art. Each track cleat is driven by three continuous chains 101 linked through drive sprockets 200 to a power source 202. The track cleat is trapezoidal in cross section, having a hollow interior generally trapezoidal in shape forming hollow chamber 146 shown in cutaway. Each end 142 is sealed with a cap 180 forming the hollow chamber 146 into a water tight compartment. A cap is affixed to each end of the cleat in a way to seal the water tight chamber. For example, it may be metal or plastic and may be tack welded or glued or bolted with or without a rubber or plastic gasket to enhance sealing.

Figure 4:
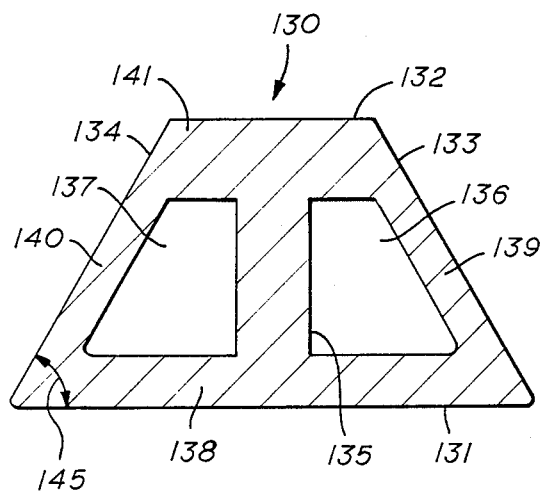
FIG. 4 is a drawing of a track cleat cross section illustrating the preferred embodiment of the present invention.
Figure 6:
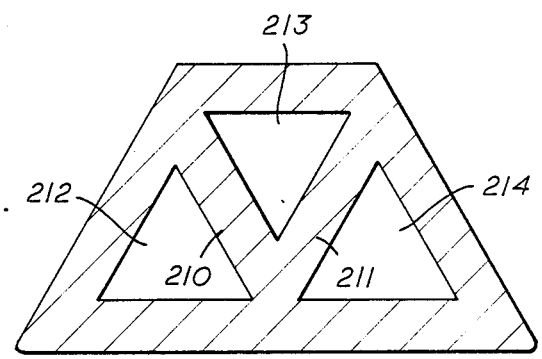
FIG. 6 is a drawing of a track cleat cross section illustrating a further embodiment of the present invention.

In the preferred embodiment, referring to FIG. 4, the body of the cleat 130 is trapezoidal in cross-section, having base 131 in parallel with face 132 and sides 133 and 134 projecting from said base at cleat angle 145 of 60 degrees, and having a hollow interior generally trapezoidal in shape and bisected by a longitudinal spine 135, forming hollow chambers 136, 137. Although the proposed shape is a trapezoid, other cross-sections may also be used to achieve the objects of the invention. Moreover, although only one spine 135 is shown, multiple spines 210, 211 forming multiple chambers 212, 213, 214 could be employed as shown in FIG. 6, or the spine 135 eliminated forming a single chamber as shown in FIG. 3. The cleat is preferably formed from a high strength, low density material such as 6061 T aluminum, preferably by an extrusion process. The cleat is preferably of a unitary construction rather than multiple integral parts. It will be obvious to those skilled in the art that other materials and processes may be employed to achieve the objects of the invention. Further the spine may be longitudinal as illustrated or horizontal and parallel to the base wall 138 or transverse as is shown in FIG. 6. Base wall 138, side walls 139, 140 and face wall 141, combine with spine 135 to outline the perimeter of the cleat 130 and hollow chambers 136, 137. The cleats of this invention are sized to provide sufficient strength for support and for resisting bending or breakage, while at the same time providing sufficient buoyancy to provide necessary support for the buggy and equipment mounted thereon. Those skilled in the art will be able to determine the most desirable proportions for each application. However, in a typical application, base wall 138 is preferably about ⅛ inch thick, side walls 139 and 140 are preferably about ⅜ inch thick, face wall 141 is preferably about ⅛ inch thick and spine 135 is preferably about ¾ inch thick. The distance from base 131 to face 132 is preferably about 2¾ inches, and base 131 is preferably about 4 13/16 inches wide Spine 135 is centered with respect to base—. Cleat angle 145 is by way of example only and not intended to limit the invention. Cleat angles from approximately 30 to approximately 90 degrees are contemplated. The specific dimensions and thicknesses referenced above are by way of a preferred example only and not intended to limit the invention.

Referring again to FIG. 3, cleat ends 142 are chamfered preferably at a 60 degree angle 144, measured from base 131 to end face 143. However, the angle 144 of the chamfer may be from 45° to 90°. The hollow chambers may be filled with a non-porous plastic material 150. One such material which is preferred is made by Insta-foam Products, Inc., and carries the designation FP-12.0. This product comes in an aerosol can, and contains Polymeric Isocyanate; Polyol Resin and Fluorocarbons. The material is installed by first capping one end 142 of the track cleat 130 with cap 180, and spraying in the plastic from the other end 142 until the chamber 146 is full. The remaining open end 142 is then capped with cap 180. A closed cell foamed plastic material may be used to fill the cleat, which will reduce water penetration into the hollow chamber 146 and thereby eliminate the need for end caps 180. A variety of materials to fill the chamber will be apparent to those of ordinary skill in the art. The characteristics of the filling material selected must be such to maintain buoyancy and prevent entry of non-buoyant heavy materials such as mud and silt or other foreign materials from the surrounding marsh or swamp environment. The filling material may be foamed in place or secured with glue, epoxy or a cap 180, as illustrated in FIG. 3, or similar means.

Figure 5:
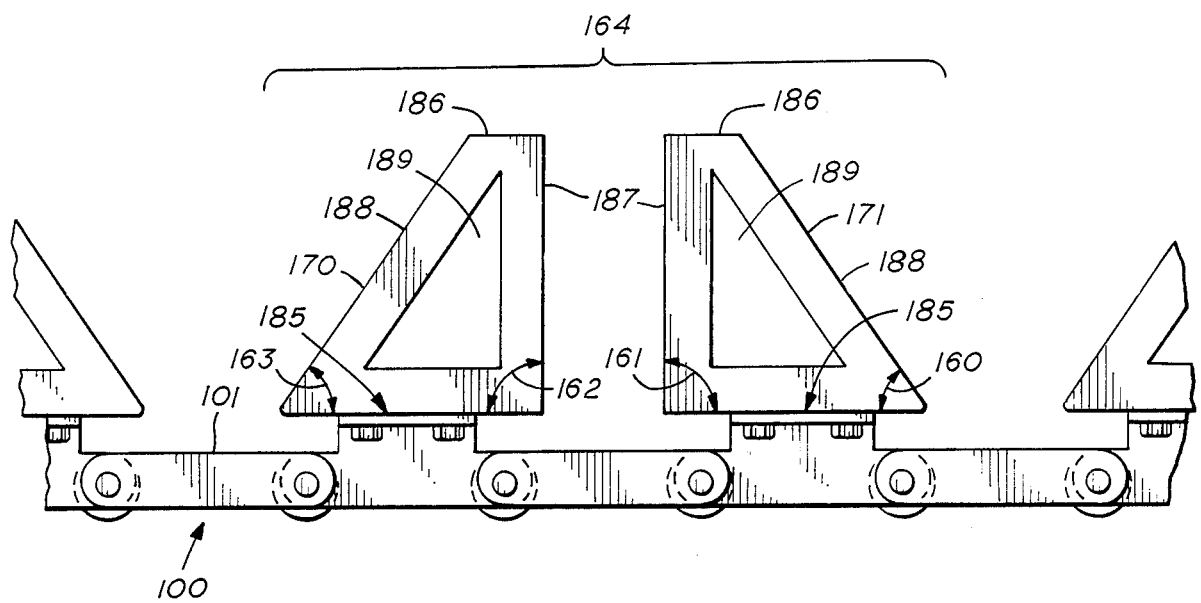
FIG. 5 is a drawing of a continuous track illustrating a further embodiment of the present invention.

FIG. 5 shows a further embodiment of the invention, wherein pairs of adjacent cleats 170, 171 are configured to form a cleat pair 164. Base 185 is substantially parallel to top 186, and side 187 is substantially perpendicular to top 186 and base 185, and disposed between them. Sloped side 188 is disposed at an angle to, and disposed between, base 185 and top 186. Base 185, top 186, side 187 and sloped side 188 form the perimeter of chamber 189. Chamber 189 is further defined by ends, not shown, and may be capped with a metal or other cap material, not shown. Further, chamber 189 may be filled with a plastic material or closed cell foamed material to prevent the entry of water, mud or other foreign objects. Adjacent angles 162 and 161 of each cleat in a cleat pair 164 are preferably substantially equivalent, as are spaced angles 160, 163.

The use of track cleats in accordance with the invention has several advantages over the prior art such as increased strength, durability and buoyancy, while the weight in water is substantially equal to the prior art cleat and wear bar system. Further, in three point bending with a load centered between mounting points spaced 24 inches on the cleat, the track cleat of the present invention carries approximately four times the load of the prior art cleat before the initiation of a permanent bending set. In a comparative test, a cleat of the present invention held a load of 40,000 lbs. in three point bending without failure, whereas a comparable prior art cross-section cleat failed at 9,900 lb. load. This combination of increased strength, without attendant weight penalty in water, allows the use of the cleat without the secondary protective devices, such as blocks and wear pads, disclosed in the prior art, thereby reducing maintenance of the amphibious vehicle.

The invention has been described with reference to the preferred embodiment. Obviously, modifications and alterations will occur to others upon reading and understanding the preceding detailed description of the preferred embodiment. This description is not intended to limit the invention. It is intended that the invention be construed as including all such alterations and modifications insofar as they come within the scope of the appended claims or the equivalents thereof.

I claim:

1. An amphibious vehicle having at least one pontoon, each pontoon enveloped by an endless drive track powered by a drive means, said endless drive track comprised of endless chains and multiple spaced, separate and distinct track cleats, at least one of said track cleats comprising a stiff body, a chamber formed within said body and means for preventing entry or transmission of foreign materials including fluids such as liquids or gas into or through said chamber.

2. A tracked vehicle having at least one endless drive track comprised of endless chains and multiple spaced, separate and distinct track cleats, at least one of said track cleats comprising a stiff body, a chamber formed within said body and means for preventing entry or transmission of foreign materials including fluids such as liquids or gas into or through said chamber.

3. A separate and distinct cleat comprising a stiff metal body, a chamber formed within said body, and means for preventing entry or transmission of foreign materials including fluids such as liquids or gas into or through said chamber.

4. The invention of claims 1 or 2 or 3 wherein the body is in the shape of a trapezoid in cross section.

5. The invention of claims 1 or 2 or 3 wherein the body is in the shape of a truncated triangle in cross section.

6. The invention of claims 1 or 2 or 3 wherein the means for preventing entry of foreign materials into said chamber comprises a plastic material.

7. The invention of claims 1 or 2 or 3 wherein the means for preventing entry of foreign material into said chamber comprises a cap.

8. The invention of claims 1 or 2 or 3 wherein the means for preventing entry of foreign material into said chamber comprises a closed cell material.

9. The invention of claims 1 or 2 or 3 wherein the body is made from an aluminum alloy.

10. The invention of claims 1 or 2 or 3 wherein the chamber is divided by a spine.

11. The invention of claims 1 or 2 or 3 wherein the body of the cleat is formed by a top, base, sides and opposed ends, the top and base being substantially parallel, the sides projecting between the top and the base at an angle such that the cross-section of the cleat is in the shape of a truncated triangle in cross-section said top, base, sides and ends forming the perimeter of the chamber, at least one of said ends being chamfered at an angle of about 60° as measured from the cleat base to end face.

12. The amphibious vehicle of claim 4 wherein the body of the cleat is formed by a top, base, sides and opposed ends, the top and base being substantially parallel, the sides projecting between the top and the base at an angle, said top, base, sides and ends forming the perimeter of the chamber, at least one of said ends chamfered at an angle of 60° as measured from the cleat base to end face.

13. The invention of claims 1 or 2 or 3 wherein the chamber is substantially filled with a closed cell material.

14. The invention of claims 1 or 2 or 3 wherein the chamber is substantially filled with a plastic material.

15. An amphibious vehicle having a pair of elongated pontoons held substantially parallel by spaced beams, each pontoon enveloped by an endless drive track powered by a drive means, said endless drive track comprised of drive chains and track cleats, said cleats having a base, top, and two sides forming a chamber having opposing open ends and means for sealing said open ends, said means for sealing including means to prevent the transmission of fluids such as gas or liquids into or through said chamber.

16. An amphibious vehicle having at least one pontoon, each pontoon enveloped by an endless drive track powered by a drive means, said drive track comprised of endless chains and track cleats, at least two of said cleats disposed as a pair, each cleat in said pair having a base, a top, a side normal to and disposed between said base and top, and a sloped side angled to and disposed between said base and side, an adjacent angle between said base and side and a spaced angle between said base and sloped side, said adjacent angles and spaced angles in each pair of cleats being substantially equivalent.

17. The amphibious vehicle of claim 16 wherein the spaced angle is approximately 60°.

18. A tracked vehicle having at least one endless drive track comprised of endless chains and multiple, spaced, separate and distinct track cleats, at least one of said track cleats comprising a stiff metal body, a chamber formed within said body, said chamber being filled with a plastic material to exclude the entry or transmission of foreign materials including fluids such as liquids or gas into or through said chamber.

19. An amphibious vehicle having at least one pontoon, each pontoon enveloped by an endless drive track powered by a drive means, said endless drive track comprised of endless chains and multiple, spaced, separate and distinct track cleats, at least one of said cleats comprising a body, a chamber formed within said body, and said chamber being filled with a closed cell material to exclude the entry or transmission of foreign materials including fluids such as liquids or gas into or through the chamber.

20. An amphibious vehicle having at least one pontoon each pontoon enveloped by an endless drive track powered by a drive means, said endless drive track comprised of endless chains and multiple, spaced, separate and distinct track cleats, at least one of said cleats comprising a body, a chamber formed within said body, and said chamber being filled with a plastic material to exclude the entry or transmission of foreign materials including fluids such as liquids or gas into or through the chamber.

21. A tracked vehicle having at least one endless drive track comprised of endless chains and multiple, spaced, separate and distinct track cleats, at least one of said track cleats comprising a body, a chamber formed within said body, said chamber being filled with a closed cell material to exclude the entry or transmission of foreign materials including fluids such as liquids or gas into or through said chamber.

* * * * *

UNITED STATES PATENT AND TRADEMARK OFFICE
CERTIFICATE OF CORRECTION

PATENT NO. : 4,846,092

DATED : JULY 11, 1989

INVENTOR(S) : PAUL WILSON

It is certified that error appears in the above—identified patent and that said Letters Patent is hereby corrected as shown below:

On column 3, line 21, section (3) ends at "... bottom of the pontoon."

On column 3, line 21 through line 33: "If the Rivet buggy ... rupture or track and cleat repair." is a continuation of the paragraph that begins on line 1, and therefore, the remainder of the paragraph should extend to the full margins.

On column 6, line 29, delete "413/16" and insert "4-13/16".

On column 6, line 30, delete "base ____." and insert "base 131."

Signed and Sealed this

Fifteenth Day of May, 1990

Attest:

HARRY F. MANBECK, JR.

Attesting Officer     Commissioner of Patents and Trademarks